United States Patent [19]

Maki, Jr.

[11] Patent Number: 5,467,320
[45] Date of Patent: Nov. 14, 1995

[54] ACOUSTIC MEASURING METHOD FOR BOREHOLE FORMATION TESTING

[75] Inventor: Voldi E. Maki, Jr., Austin, Tex.

[73] Assignee: Halliburton Company, Dallas, Tex.

[21] Appl. No.: 2,373

[22] Filed: Jan. 8, 1993

[51] Int. Cl.[6] ............................ G01V 1/40; G01V 1/143
[52] U.S. Cl. ............................ 367/40; 367/27; 181/102; 364/422
[58] Field of Search .................. 367/25, 27, 29, 367/40, 100; 382/42; 181/102; 364/421, 422, 821

[56] References Cited

U.S. PATENT DOCUMENTS

| | | | |
|---|---|---|---|
| 4,270,180 | 5/1981 | Charlton | 364/728 |
| 4,543,632 | 9/1985 | Ergas et al. | 364/421 |
| 4,862,423 | 8/1989 | Rector | 367/25 |
| 4,964,087 | 10/1990 | Widrow | 367/40 |
| 5,005,144 | 4/1991 | Nakajima et al. | 364/565 |

FOREIGN PATENT DOCUMENTS 519675   12/1992   European Pat. Off. .

OTHER PUBLICATIONS

Poletto et al, 53rd EABC Mtg., May 26, 1991, pp. 566–567, ISBN 90–73 781–03–5.
Rector et al, 58th Int. Mtg. of SEG, Calif., pp. 1–23.
Nordy et al, 24th Ann. SPE et al. ofc (Houston) May 4, 1992, pp. 447–461; Abst. Enclosed Herewith.
Allen et al, Oilfield Rev, #1, pp. 4–17, Apr. 1989 Abst. Only Provided Herewith.

*Primary Examiner*—Nelson Moskowitz
*Attorney, Agent, or Firm*—Arnold White & Durkee

[57] ABSTRACT

An acoustic formation apparatus is set forth. It utilizes the drill bit on a drill stem as the acoustic source. At a common azimuth and spaced vertically along the drill stem, first and second acoustic transducers are installed. They connect to first and second amplifiers, first and second band pass filters, first and second clipping circuits, a single delay circuit and a cross correlating circuit. The signals are received, filtered, amplified, clipped, one delayed, and then cross correlation is made utilizing variable time delays. The resulting cross correlation function is analyzed using a microprocessor which removes stationary correlation peaks and ignores very short correlation delay times. This enables removal of the substantially fixed aspect of the pipe transmitted signal and the very fast propagating waves so that the processed cross correlation function output is substantially related to the formations and the larger, over powering signal transmitted along the drill string through the steel pipe making up the drill collars is substantially avoided.

5 Claims, 1 Drawing Sheet

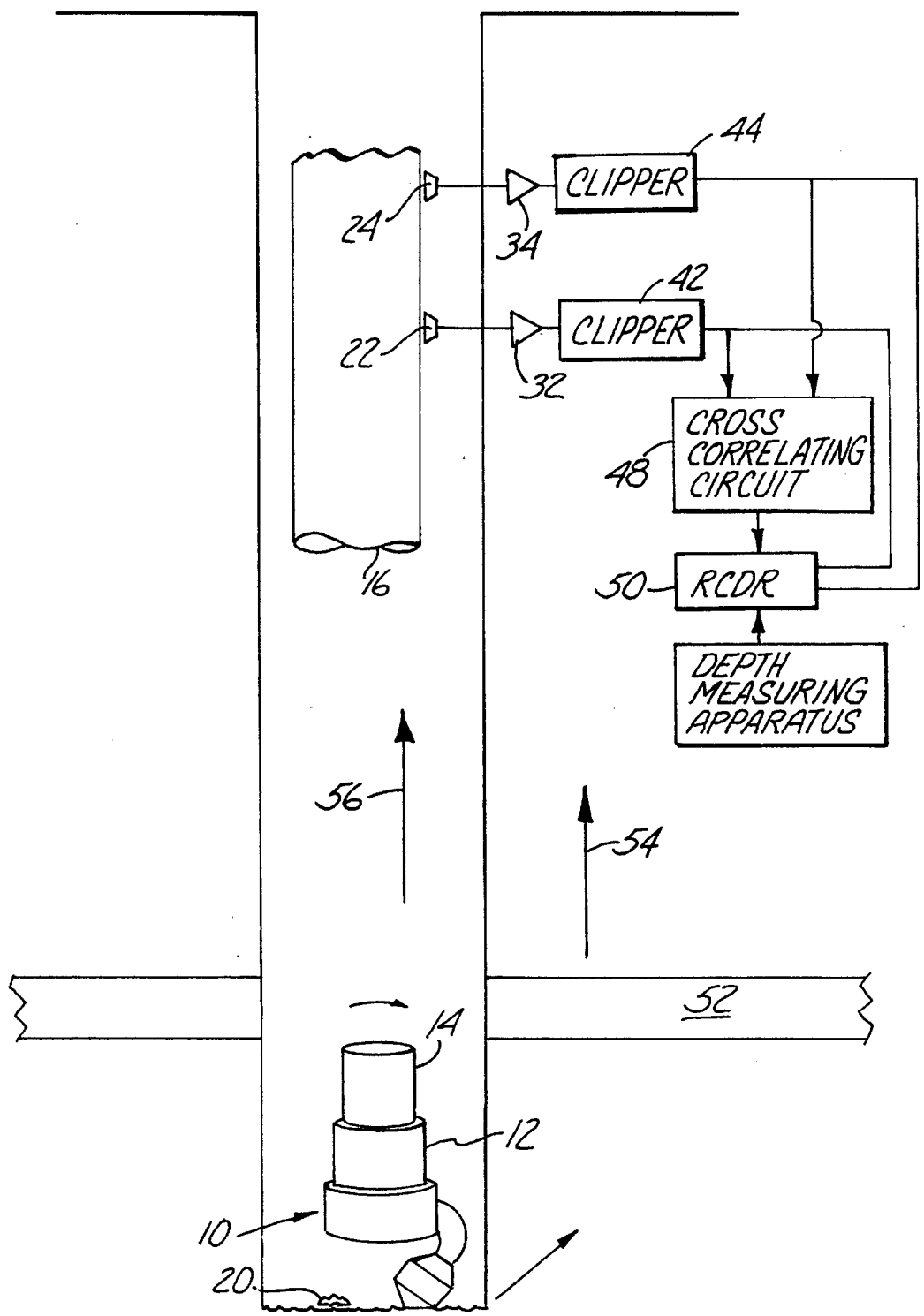

ACOUSTIC MEASURING METHOD FOR BOREHOLE FORMATION TESTING

BACKGROUND OF THE DISCLOSURE

The present disclosure is directed to an MWD acoustic measuring system. This disclosure utilizes a conventional drill collar construction affixed to a drill bit which enables the measurement of formation characteristics near the borehole. More specifically, it is an acoustic measurement device which uses the noise from the drilling device as the acoustic source. The acoustic signal in turn provides the information required to evaluate the formations near the borehole.

In drilling a well, a drill collar is a heavy section of tubing connecting the drill bit to the drill string. The drill collar provides the weight to force the drill bit into the formation, provides directional stability and is sometimes used because of its larger cross section as a location for sensors. As the well is drilled deeper, it becomes important to measure formation characteristics. It is especially important to measure characteristics of the formations next to the well borehole in a timely fashion, while drilling as opposed to using a wire line measurement after the hole has already been drilled to its maximum depth. One primary measurement of the formation is the sound velocity of compressional and shear waves. Another primary measurement is to determine the locations of boundaries between different types of formations. Acoustic measurements may be used to determine this information.

In a typical acoustic measurement tool, a sonic source is normally located at one point along the drill collar and transmits to another point along the drill collar. The acoustic energy radiates into the formation, travels along the borehole all the time some of the energy is going back into the borehole fluid. Receivers in the drill collar some distance from the transmitter, detect the energy in the fluid which comes from the formation to determine the sound velocity in the formation. Typically the shear wave velocity and compressional wave velocity in the formation is greater than the velocity of sound in the fluid. The differences in propagation times of the various signals allow their separation and measurement. It has also been demonstrated that the acoustic waves reflect from changes in the formation impedance.

During the drilling of a well, there are only a few different pathways for acoustic energy propagation. One pathway is through the formation. Another pathway is through the annular space in the well borehole on the exterior of the drill collar which is normally filled with drilling fluid. Also, there is another pathway which is through the drill collar. This steel column is a highly efficient medium for acoustic transmission. The sound velocity in this medium is also typically greater than the sound velocity in the formation. If there is an acoustic transmitter at some down hole location and an acoustic receiver at some distance from the transmitter, and both are relatively close to the well borehole, then it is not possible to transmit energy solely through the formation. Though techniques have been utilized to acoustically isolate the drill bit from the collars with some success, the coupling of the signal is not completely eliminated. The use of a mud motor will also effectively reduce but not eliminate the acoustic transmission to the drill collars.

This disclosure sets forth a system which can provide for the measurement of acoustic transmission in the formation and more specifically a system which enables the measurement of the acoustic transmission along a well borehole while the signal is also propagating in the drill collars. More specifically, this disclosure uses an acoustic source which is the drill bit itself. As the drill bit is rotated by the drill collar, the teeth on the drill bit bite into the face of the hole and make chiseling cuts. The energy of these cuts serves as an acoustic energy source. The acoustic energy will propagate through the formations parallel to the borehole and thus provide the desired pathway to each receiver. However, it is certain that a substantial portion of the acoustic energy that is formed by the drill bit operation will be transmitted up the drill collars to the receivers. Acoustic receivers are placed at two or more locations along the drill collars. The receive the acoustic energy propagating through the formation as well as the signal which propagates along the annulus between the drill collar and the formation. More importantly they receive the signal which propagates along the drill collar. This signal will typically be much larger than the signal which arrives from the formation or the annulus. The present disclosure sets forth a method and a procedure for data reduction so that the large drill collar conveyed signal will not interfere with the measurement of the formation signal.

This is accomplished in part by providing amplifiers at the acoustic receivers which clip the input signals to produce a sequence of 1's and 0's corresponding to the polarity of the received signal. The clipped signals are then cross correlated to produce a cross correlation function which describes the propagation velocities of various signal paths. The measured propagation velocities and the variability of the measured velocities allow separation of the desired values.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in appended drawings.

It is to be noted, however, that the appended drawings illustrate only typical embodiments of this invention and are therefore not to be considered limiting of its scope, for the invention may admit to other equally effective embodiments.

The drawing shows a drill bit appended to a drill collar which is rotated and thereby serves as an acoustic generator, forming acoustic signals which travel through the formations, and which signals are observed at a pair of similar acoustic receivers on the drill collar and which form output signals which are used in forming a signal which is distinctive to the sound velocity of the compressional and shear waves in the formation.

DETAILED DESCRIPTION OF THE PREFERRED EMBODIMENT

Attention is now directed to the only view of the drawings which shows a well borehole being drilled in the conventional fashion. The circuitry of the present disclosure is included and its mode of connection and operation will be given below. More specifically, the numeral 10 identifies the drill bit which is affixed by means of a suitable threaded drill collar connection 12 with a drill collar 14. The drill collar, comprising one or more joints thereof, connects with a steel drill pipe 16 which extends to the surface and which is rotated to the right during drilling. The drill bit 10 is preferably a roller cone drill bit, however it may also be a PDC or a diamond bit, The roller cone drill bit has three cones which support teeth formed of heat treated steel. The heat treated steel teeth are able to drill for hours. The contact of a set of teeth 18 against the bottom face of the borehole serves as an acoustic noise. As the drill bit is rotated, the teeth normally accomplish cutting of the hole but for purposes of this disclosure, they also form an acoustic signal. The PDC bit produces a signal as the result of shearing the formation. The signal appears in bursts because of the cut and break operation of the bit. Because of the nature of this measurement, large variations in the signal amplitude do not affect the final measurement. The diamond bit produces a more regular sound because the bit is turning more smoothly than the PDC bit. Further up the drill string and supported on the drill pipe or drill collars, the apparatus includes first and second acoustic listening devices 22 and 24. They are preferably identical to each other and differ only in their physical locations. For instance, they are spaced on the same side of the drill collar and are preferably between one-half and five feet apart. They are located at the same azimuth on the drill collar so that they receive the same signal.

By means of idealized ray paths, even though several are possible, only two are represented. Assume for purposes of discussion that one ray path passes into the formations and goes through the formation 52. The ray path has an idealized segment 54 which is parallel to the well borehole. It is exclusively outside the borehole. The numeral 56 identifies another pathway which is up through the steel drill collar. This path carries acoustic energy to the acoustic transducers 22 and 24. Not only does that acoustic energy propagate with very little attenuation, it is also arrives with little time delay.

The following should be considered in analysis of these two pathways and the manner in which the two acoustic pathways provide data at the transducers 22 and 24. As a first point, the acoustic source is the rotating roller cone drill bit. Representative drill bit teeth have been shown at 20, and they form a broad band signal. Different types of bits have different acoustic signatures, but all produce relatively broad band signals. This signal is propagated to the two acoustic receivers. Consider first the collar transmitted signal. It travels on a direct path through the steel pipe and therefore arrives rapidly at transducers 22 and 24. There will be an incremental delay time between the signals received by the two transducers. Separately from that, signals arrive at the transducers 22 and 24 which propagate along the direction of the arrow 54. In other words, they travel through the formation. These involve a separate time delay different and typically greater than the time delay related to the path through the collar. Indeed as the formation changes character this time delay will vary. Since the drill bit also creates shear waves in the formation which propagate at a slower velocity a second signal will arrive from the path shown at 54. The difference in arrival time seen by the two transducers will be even greater for this signal.

The acoustic listening devices 22 and 24 are each connected with amplifiers 32 and 34. These amplifiers are simply used to buffer the signals to create a low output impedance. The amplifiers are each connected to band pass filters 36 and 38 to select the proper frequency for the measurement. For instance, very low frequencies related to the rotation of the drill are not of interest and only mask the desired signal. Once the proper frequency bands are selected, the signals are clipped in clipper circuits 42 and 44. These circuits amplify the signals so much that they become a sequence of 1's and 0's whose rise and fall times indicate the zero crossings of the original signal. The signals are now simply digital signals. One of the signals, the signal from the sensor nearest the drill bit is passed through a delay line. The amount of delay is representative of the delay an acoustic signal would experience propagating through the formation the distance equal to the spacing between the two sensors. The delay is controlled by a delay control circuit so that the range of delays possible in the formation is covered.

The delayed signal and the signal from the second sensor are cross correlated in a polarity coincidence correlation circuit 48 utilizing an exclusive-or gate. The output of the exclusive-or is integrated in while one specific delay is implemented. The integration time determines the processing gain of the system. That is to say, the longer the integration time, the better the ability to resolve even very low amplitude signals relative to the collar born signal. Each delay time and integration creates one point in the cross correlation function. Each acoustic arrival path will produce a peak in the cross correlation function whether it is through the formation, the fluid or through the drill collar. The height of the peak represents the total energy in that particular path. The correlation function is recorded in 50 where it is analyzed using a microprocessor contained within the tool. One aspect of the signals is the formation of both shear and compressional waves. The idealized propagation pathways for the signals including the formation pathway 54 and the pathway through the steel pipe 56 conduct signals which include components derived from the shear and compressional wave fronts. While these are technically different types or modes of acoustic transmission, nevertheless, they are involved in and relate to the acoustic energy which is coupled to the acoustic transducers. Indeed in the casing, waves will propagate up to the first large discontinuity like the start of the drill pipe 16 and be reflected back past the receivers, back to the bit, and back past the receivers again greatly complicating the signal which must be analyzed.

At both of the acoustic transducers, the pipe transferred wave front will be observed first and the formation transferred acoustic wave will occur secondly. The microprocessor 64 will examine the correlation function and will eliminate the peaks which correspond to sound velocities too great for the formation. It will also determine which peaks are stationary and are therefore related to the drill collar. Any correlation peaks which are moving will be related to the formation or the drilling fluid. The fixed nature of the acoustic pathway substantially eliminates the significance of the acoustic wave transmitted up the fixed steel column which is made of drill collars, drill pipe, and the like. Rather, the pathway of significance is defined by the formation pathway which is variable depending on the nature of the formations, the formation materials, interfaces in the adjacent formations, etc. Suffice it to say, the cross correlation can provide an output data stream reflecting the nature, and especially the variations in the nature of the adjacent formations. The fixed nature of the steel column between the noise source and the transducers enables that aspect of the received signal to be reduced, even eliminated. Techniques for interpretation of the acoustic data obtained through the formations are believed to be well known. The data stream indicative of the nature of the formations is transferred to the surface for disposition at the surface.

If the correlation function is stored for later recovery, the time of the measurement is recorded also using information from a time measuring circuit contained within the tool.

I claim:

1. A method of evaluating a subsurface formation while drilling a borehole penetrating said formation through use of a drill string including a drill bit, comprising the steps of:

providing first and second receivers in said drill string, said receivers in spaced relation to said drill bit and in spaced relation to one another, said receivers generally azimuthally aligned with one another;

rotating said drill bit to drill said borehole and to generate an acoustic signal propagating at least in part through said formation;

monitoring received acoustical signals at each of said receivers in said drill string, said received acoustical signals including a selected frequency range of interest;

converting said received acoustical signals at each of said first and second receivers into a respective generally digital received signal;

delaying the digital received signal from the receiver nearest to said drill bit; and cross correlating said delayed digital received signal and the non-delayed received signal to identify signal components resulting from fixed members in the path of said acoustic propagation to identify signals representative of propagation through said formation to provide an output signal representative of properties of said formation.

2. The method of claim 1, wherein said monitored received acoustical signals at each of said receivers are filtered to remove signals outside of said selected frequency range of interest.

3. The method of claim 1, wherein said step of converting said received signals at each of said first and second receivers into a respective generally digital received signal is accomplished by amplifying said received signals sufficiently to cause clipping of said signals.

4. The method of claim 1, wherein said first and second receivers are spaced at a selective distance between one-half foot and five feet apart.

5. The method of claim 1, wherein said step of cross correlating said delayed digital received signal and said non-delayed received signal includes the step of eliminating peaks corresponding to sound velocities too great to have propagated through said formation.

* * * * *